United States Patent
Meiri

(10) Patent No.: US 6,886,164 B2
(45) Date of Patent: Apr. 26, 2005

(54) SELECTION OF A RESOURCE IN A DISTRIBUTED COMPUTER SYSTEM

(75) Inventor: David Meiri, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 698 days.

(21) Appl. No.: 09/851,039

(22) Filed: May 8, 2001

(65) Prior Publication Data

US 2002/0169816 A1 Nov. 14, 2002

(51) Int. Cl.[7] .................................................. G06F 9/00
(52) U.S. Cl. ..................... 718/104; 709/226; 709/229; 702/179; 702/186
(58) Field of Search ................................ 718/104, 107, 718/100, 101, 103, 105; 709/226, 229, 200; 702/186, 179

(56) References Cited

U.S. PATENT DOCUMENTS

| | | | |
|---|---|---|---|
| 5,093,794 A | * 3/1992 | Howie et al. ............... | 700/100 |
| 5,369,570 A | * 11/1994 | Parad .............................. | 705/8 |
| 5,854,754 A | * 12/1998 | Cabrera et al. ................ | 703/2 |
| 5,905,889 A | 5/1999 | Wilhelm, Jr. ................ | 395/674 |
| 6,085,216 A | 7/2000 | Huberman et al. ......... | 709/104 |
| 6,219,649 B1 | 4/2001 | Jameson ......................... | 705/8 |
| 6,219,728 B1 | 4/2001 | Yin ............................ | 710/52 |
| 6,574,587 B1 | * 6/2003 | Waclawski .................. | 702/186 |
| 6,658,473 B1 | * 12/2003 | Block et al. ................ | 709/226 |

OTHER PUBLICATIONS

International Search Report, Sep. 4, 2002.

* cited by examiner

*Primary Examiner*—Majid Banankhah
(74) *Attorney, Agent, or Firm*—Fish & Richardson P.C.

(57) ABSTRACT

A method for selecting a resource from a plurality of resources includes determining a score for that resource on the basis of a stochastic property of that resource. An interval corrsesponding to that resource is then defined to have an extent that depends on the score. A particular resource is then selected by generating a random number and selecting that resource when the random number falls within the interval.

26 Claims, 4 Drawing Sheets

SELECTION OF A RESOURCE IN A DISTRIBUTED COMPUTER SYSTEM

This invention relates to distributed computer systems, and in particular, to the selection of system resources by a constituent processor of a distributed computer system.

BACKGROUND

A distributed computer system includes a large number of processors, each with its own local memory. These processors all share a common memory. The common memory includes several queues in which are listed instructions for various processing tasks waiting to be performed. When a processor becomes free, it selects one of these queues and carries out the processing task waiting at the front of the queue.

In selecting a queue, the processor attempts to minimize the waiting time of each processing task in each queue. Since waiting time depends, in part, on queue length, it is useful for the processor to know how many tasks are waiting in each queue before selecting a queue.

In a distributed computer system, several other processors are constantly adding and deleting processing tasks from the queues. This causes the length of each queue to change unpredictably. As a result, in order for a processor to know the length of a queue, it must take the time to poll the queue. However, if each processor, upon completing a processing task, were to poll each queue, the overhead associated with selecting a queue becomes unacceptably high.

A distributed computer system occasionally communicates with other distributed computer systems. To do so, a sending processor from a source distributed computer system sends a message to one of the constituent processors on a target distributed computer system. A prerequisite to doing so is the selection of a receiving processor from among the constituent processors of the target system.

Preferably, a sending processor selects, as the receiving processor, that processor on the target system that is the least busy. However, in doing so, the sending processor faces a problem similar to that described above in the context of selecting a queue. Short of polling each processor in the target system, there is no simple and reliable mechanism for identifying the processor that is the least busy.

SUMMARY

The problem of selecting a receiving processor and selecting a queue are examples of the more general problem of selecting a resource on the basis of a stochastic property of that resource. Rather than attempt to determine with certainty the value of the stochastic property for each resource, the method of the invention selects resources probabilistically, using estimates of the current, or present values of the stochastic property for each of the available resources.

One method for selecting a resource from a plurality of resources, includes determining a score for that resource on the basis of a stochastic property of the resource and then defining an interval corresponding to the resource. The extent of that interval is selected to depend on the score for that resource. A random number, is then generated and that resource is selected if the random number falls within the interval defined for that resource. The random number can, but need not be, uniformly distributed over the set of all intervals associated with the plurality of resources.

The method thus has the quality of spinning a roulette wheel having as many slots as there are resources to select from, with the extent of each slot being dependent on the value of the stochastic property of the resource associated with that slot. This ensures that resources having desirable values of that stochastic property are more likely to be selected but that all resources have some probability of being selected.

In a first practice of the invention, the resource is selected to be a queue and the stochastic property of the resource is the queue-length of the queue. In a second practice of the invention, the resource is a processor and the stochastic property is the workload of that processor.

In both cases, the method includes determining a score for each resource from the plurality of resources available for selection. This includes estimating a present value of the stochastic property of that resource, typically on the basis of prior measurements of that stochastic property. In one aspect of the invention, the prior measurement is the last-known value, or most recent measurement of that stochastic property for the resource in question.

The extent of the interval associated with a particular resource depends on the score associated with that resource. In one practice of the invention, the extend depends on the normalized score for that resource. The score determined for a resource can be normalized by evaluating a sum of scores assigned to each resource in the plurality of resources and normalizing the score assigned to the resource by the sum of scores.

The method also includes an optional step of periodically updating the measurements upon which an estimate of a current value of a stochastic property are based. In one practice of the invention, a resource that has been selected is also polled to determine the current value of the stochastic property for that resource. This current value then becomes the new last-known value for the stochastic property of that resource.

These and other features of the invention will be apparent from the following detailed description and the accompanying figures in which:

DETAILED DESCRIPTION

Figure 1:
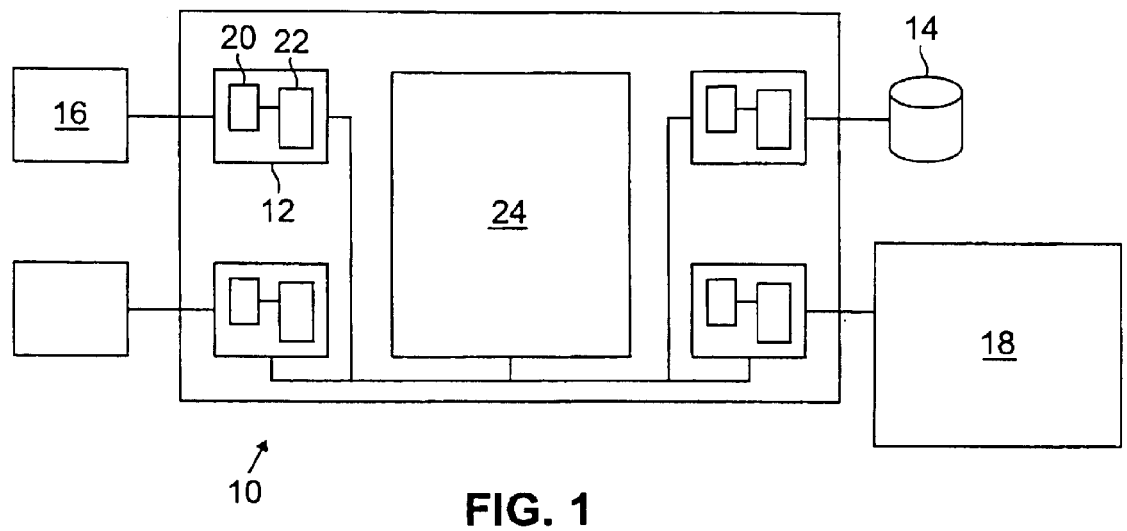
FIG. 1 shows a data storage system.

A data-storage system 10 for that carries out a resource selection method, as shown in FIG. 1, includes several adaptors 12 that interface with external devices. These external devices can be data storage devices 14, such as disk drives, in which case the adaptors are called "disk adaptors." The external devices can also be hosts 16, or processing systems that are directly accessed by users of the data-storage system 10, in which case they are referred to as "host adaptors." The external devices can also be remote data-storage systems 18 for mirroring data in the data-storage system 10, in which case the adaptors are referred to as "remote adaptors." Each adaptor 12 includes its own processor 20 and a local memory 22 available to the processor 20.

The data-storage system 10 also includes a common memory 24 that is accessible to all the adaptors. The common memory 24 functions as a staging area for temporary storage of data. The use of a common memory 24 improves performance of the data-storage system 10 by reducing the latency associated with accessing mass storage devices.

Figure 2:
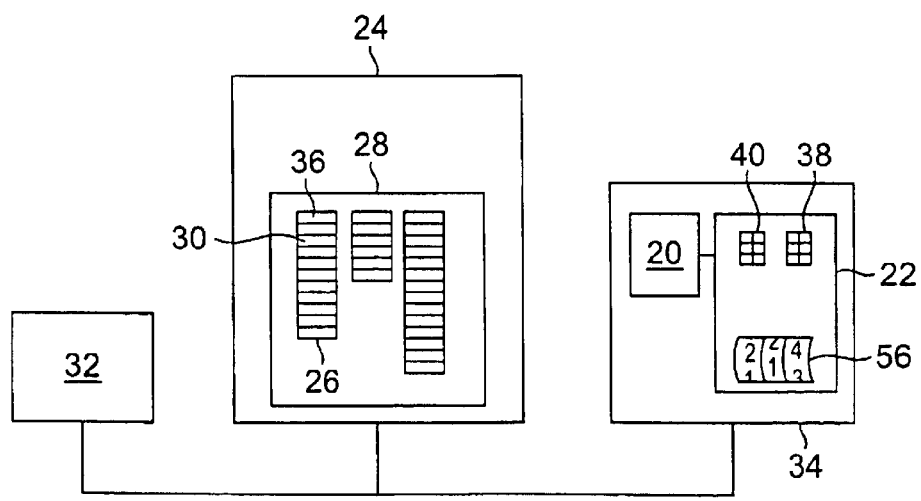
FIG. 2 shows the contents of the local cache memory and the global memory of the data storage system of FIG. 1.

The various adaptors 12 in the data-storage system 10 cooperate with each other to assure an orderly flow of data from the common memory 24 to or from the mass storage devices 14, hosts 16, and mirror sites 18. To cooperate effectively, the adaptors 12 must communicate with each other. This communication is implemented by maintaining one or more queues 26 in a queue portion 28 of the common memory 24, as shown in FIG. 2. When an adaptor 32 requires that a particular task be executed by another adaptor, it leaves, on a queue 26 within the queue portion 28, a message 30 requesting that the task be carried out. An adaptor 34 scanning the queue can then encounter the message 30 and execute that task.

Throughout the remainder of this specification, the adaptor 32 leaving the message is referred to as the "request-adaptor;" the adaptor 34 that carries out the task specified in the message is referred to as the "execution-adaptor." It is understood, however, that these are logical designations only. Disk adaptors, host adaptors, and remote adaptors can each take on the role of a request-adaptor 32 or an execution-adaptor 34 at various times during the operation of the data-storage system 10.

Certain tasks in the data-storage system 10 are urgent and must be carried out promptly. Other tasks are less time-sensitive. To accommodate this, the data-storage system 10 assigns different priorities to the queues 26. When a request-adaptor 32 has a task to be executed, it determines the priority of the task and places it in the queue 26 whose priority is appropriate to the urgency of the task.

Each queue 26 contains a varying number of messages 30. This number is referred to as the queue-length. The queue-length has a lower bound of zero and an upper bound that depends on the configuration of the disk-storage system 10. In the course of normal operation, request-adaptors 32 add new messages to the queue 26 and execution-adaptors 34 carry out requests specified in messages and delete those messages from the queue 26. As a result, the queue-length is a time-varying random number.

When an execution-adaptor 34 becomes free to execute a processing task, it selects a queue 26 and executes the processing task specified by a topmost message 36 in that queue 26. The execution-adaptor 34 selects the queue 26 so as to minimize the waiting time for all pending messages in all queues. In most cases, this requires that the execution-adaptor 34 select the queue 26 having the greatest queue-length.

Because the queue-length is a time-varying random number, the execution-adaptor 34 cannot know with certainty the length of each queue 26 at the moment when it is necessary to select a queue 26. Even if the execution-adaptor 34 were to incur the overhead associated with polling each queue 26, it would be possible for other adaptors 12 to add or delete a message 30 from a queue 26 that has just been polled by the execution-adaptor 34. This introduces error into the execution-adaptor's assessment of the queue-lengths.

To avoid having to poll each queue 26 whenever it becomes free to carry out a request from one of the queues, the execution-adaptor 34 caches, in its local memory 22, a queue-length table 38 listing the length of each queue 26 at the time that the execution-adaptor 34 last carried out a request pending on that queue 26. The table-entries in the queue-length table 38 are thus the last-known queue-lengths for each queue 26. These last-known queue-lengths function as estimates of the queue-lengths at the moment when the execution adaptor 34 selects a queue 26.

The execution-adaptor 34 updates a queue's entry in the queue-length table 38 whenever it accesses that queue 26 to carry out a request. Since the execution-adaptor 34 already has to access the queue 26 in order to carry out a request pending on that queue 26, there is little additional overhead associated with polling the queue 26 to obtain its queue-length.

The execution-adaptor 34 also maintains a priority table 40 listing the priority values assigned to each queue 26. A high-priority queue is characterized by a large integer in the priority table 40. Lower priority tables are characterized by smaller integers in the priority table 40.

Figure 3:
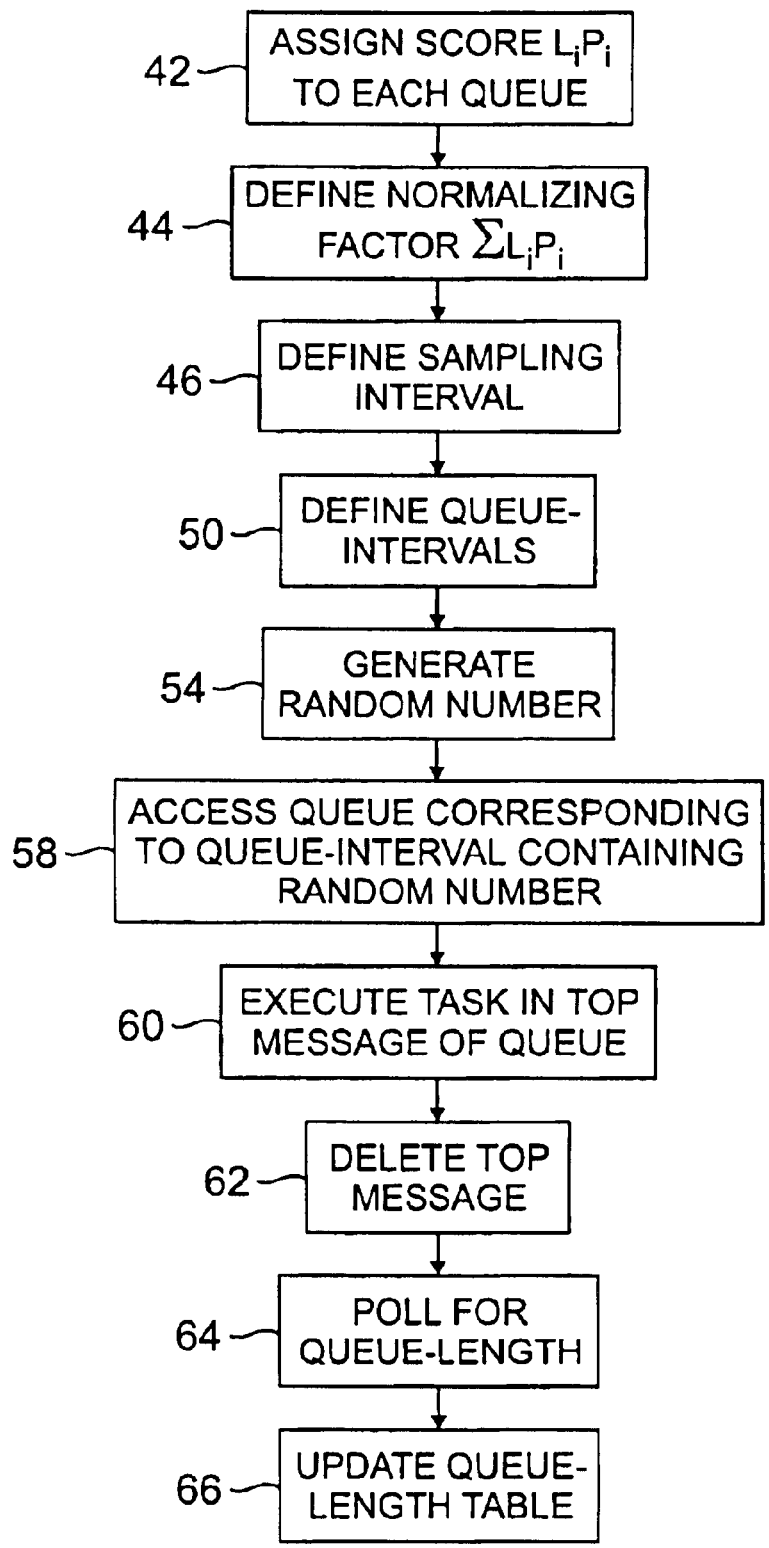
FIG. 3 is a flow-chart illustrating a queue-selection method.
Figure 4:
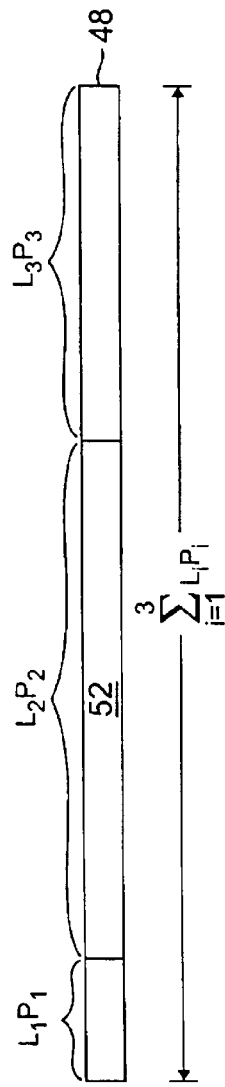
FIG. 4 is a sampling interval for the queue-selection method illustrated in FIG. 3.

Referring now to FIG. 3, the execution-adaptor 34 selects a queue 26 by first assigning 42 a score to each queue 26. It does so by weighting the estimate of the queue-length for each queue 26 with the priority assigned to that queue 26. The result is referred to as the "effective queue-length" for that queue 26. The execution-adaptor 34 then sums 44 the effective queue-lengths for all queues 26 and defines 46 a sampling interval 48 having an extent equal to that sum, as shown in FIG. 4.

The execution adaptor 34 then divides 50 the sampling interval 48 into as many queue-intervals 52 as there are queues 26. Each queue-interval 52 has an extent that corresponds to the effective queue-length of the queue 26 with which it is associated. In the illustrated embodiment, the extent of each queue-interval 52 is the effective queue-length normalized by the extent of the sampling interval 48. In addition, each queue-interval 52 is disjoint from all other queue-intervals. As a result, each point on the sampling interval is associated with one, and only one, queue 26.

Once the queue-intervals 50 are defined, the execution-adaptor 34 executes 54 a random number process 56 (see FIG. 2) that generates a random number having a value that is uniformly distributed over the sampling interval 48. The random number will thus have a value that places it in one of the queue-intervals 52 that together form the sampling interval 48. The probability that the random number will be in any particular queue-interval 52 depends on the last-known effective queue-length of the queue 26 corresponding to that queue-interval relative to the last-known effective queue-lengths of all other queues.

The execution-adaptor 34 then accesses 58 the queue 26 corresponding to the queue-interval 52 that contains the random number and carries out 60 the task specified by the topmost message 36 in that selected queue 26. Once the task is completed, the execution-adaptor 34 deletes 62 the topmost message 36 from the selected queue 26 and polls 64 the selected queue 26 to obtain its queue-length. The execution-adaptor 34 then updates 66 the entry in its queue-length table 38 that corresponds to the selected queue 26.

By using a locally-cached last-known queue-length to formulate an estimate of a current effective queue-length, the queue-selection method described above avoids polling each queue 26 to obtain its current queue-length. The foregoing queue-selection method can thus rapidly select a queue 26 that, while not guaranteed to be have longest effective queue-length, most likely does. Because each queue 26 has some probability of being selected, the queue-selection method described above also avoids neglecting any queue 26. This ensures that tasks waiting on queues having a low effective queue-length are nevertheless performed within a reasonable waiting period. This also ensures that queues having a low effective queue-length are occasionally polled to see if their effective queue-lengths have changed.

A data-storage system 10 can be configured to maintain several queues 26 all of which have the same priority. A data-storage system 10 offers more flexibility in load balancing than a data-storage system having only a single queue because in such a system, several adaptors can carry out pending requests simultaneously.

The foregoing method can also be carried out in a data-storage system 10 in which all the queues 26 have the same priority. In such a data-storage system 10, the effective queue-length can be set equal to the queue-length, in which case the priority table 40 is unnecessary. Alternatively, the entries in the priority table 40 can be set equal to each other.

The method described above can be adapted to select any resource on the basis of a stochastic property of that resource. In the application described above, the resource is a queue 26 and the stochastic property that provides the basis for selection is the length of that queue. In the application that follows, the resource is a remote adaptor on a remote mirroring site 18 and the stochastic property that provides the basis for selection is the processing workload associated with the remote adaptor.

A distinction between the two cases is that in the first case, it is preferable to select the resource having a high value of the stochastic property and in the second case, it is preferable to select the resource having a low value of the stochastic property. This distinction is readily accommodated in the second case by working with the inverse of the stochastic property rather than with the stochastic property directly.

Figure 5:
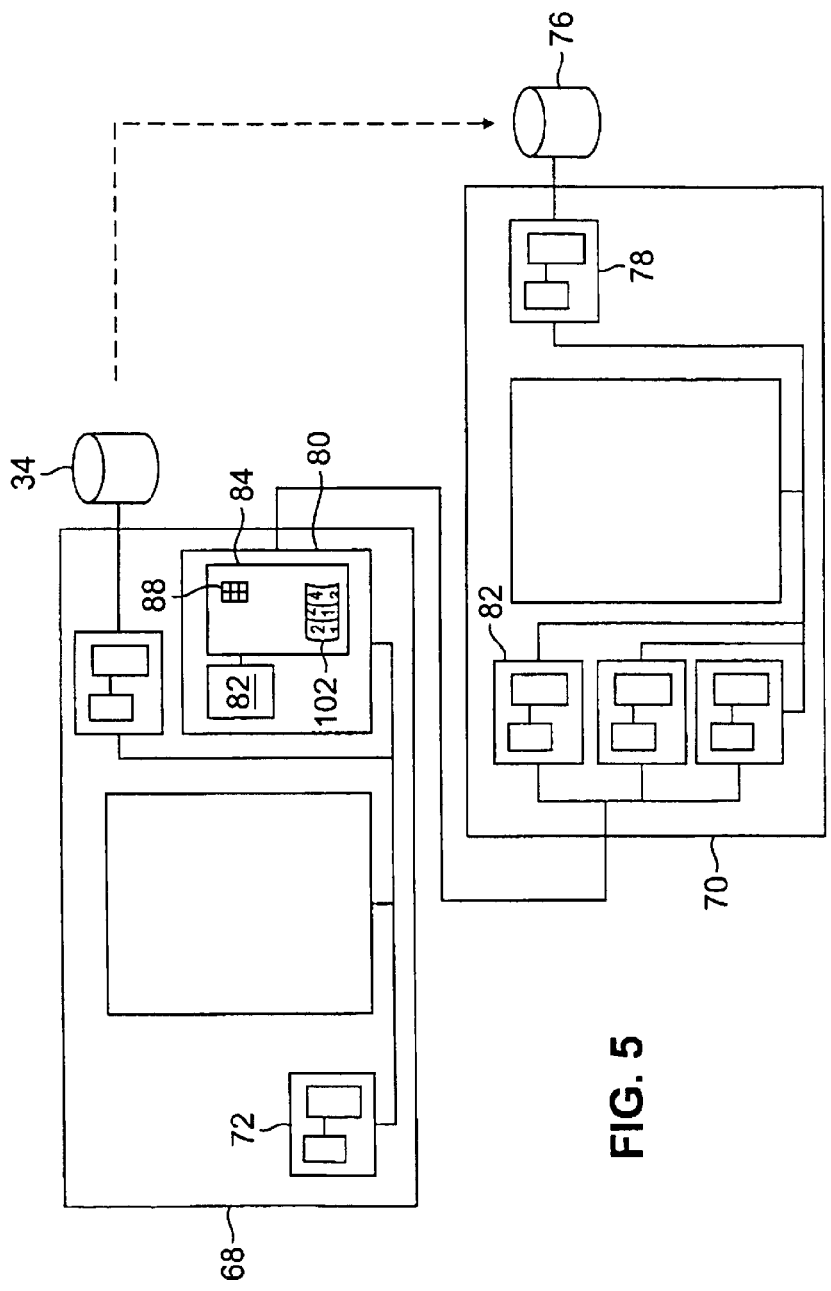
FIG. 5 shows the data-storage system of FIG. 1 in communication with a remote data-storage system.

Referring now to FIG. 5, a first data-storage system 68 sometimes communicates with a second data-storage system 70. For example, when a host adaptor 72 associated with the first data-storage system 68 writes to a device 74 that is mirrored on a mirror device 76 controller by a disk adaptor 78 associated with the second data-storage system 70, a remote adaptor 80 on the first data-storage system 68 establishes communication with a selected remote adaptor 82 on the second data-storage system 70. The remote adaptor on the first data-storage system 68 will be referred to as the "sending adaptor" 80 and the remote adaptors on the second data-storage system 70 will be referred to as the "receiving adaptors" 82. Each remote adaptor 80, 82 has its own processor 82 and local memory 84.

It is understood that the designations "receiving adaptor" and "sending adaptor" are logical designations only. For example, the second data-storage system 70 may have devices that are mirrored on the first data-storage system 68, in which case a remote adaptor 82 of the second data storage system 70 can function as a sending adaptor and a remote adaptor 80 on the first data storage system 68 can function as a receiving adaptor.

In establishing communication, the sending adaptor 80 selects one of the available receiving adaptors 82. Preferably, the sending adaptor 80 selects the receiving adaptor 82 that is the least busy. However, because of the overhead associated with communicating with the receiving adaptors 82, it is impractical for the sending adaptor 80 to poll each of the receiving adaptors 82 to determine which of the receiving adaptors 82 is the least busy.

In addition, the sending adaptor 80 cannot know with certainty whether the information it relies upon in selecting a receiving adaptor 82 is accurate. For example, it is possible that, in the brief interval between being polled by a sending adaptor 80 and being asked to carry out a task by the sending adaptor 80, a receiving adaptor 82 may have taken on requests sent by other sending adaptors 80.

To avoid having to poll each receiving adaptor 82, the sending adaptor 80 maintains, in its local memory 84, a workload table 86 having information indicative of the workload carried by each receiving adaptor 82 at the time that the sending adaptor 80 last engaged in an I/O transaction with that receiving adaptor 82. The workload associated with a particular receiving adaptor 82 is thus the last-known workload for that receiving adaptor 82. The receiving-adaptor selection method uses the last-known workloads of the receiving adaptors in the workload table 86 to estimate how busy each receiving adaptor 82 is at the time that the sending adaptor 80 selects a receiving adaptor 82.

The sending adaptor 80 updates the corresponding entry in the workload table 88 entry for each receiving adaptor 82 whenever it engages in an I/O transaction with that receiving adaptor 82. Since the sending adaptor 80 already had to establish communication with the receiving adaptor 82 in order to engage in an I/O transaction with that adaptor 82, there is little additional overhead associated with polling the receiving adaptor 82 to obtain a measure of how busy that receiving adaptor 82 currently is. In response to polling by the sending adaptor 80, the receiving adaptor 82 provides an integer indicative of the number of tasks it is handling concurrently.

Figure 6:
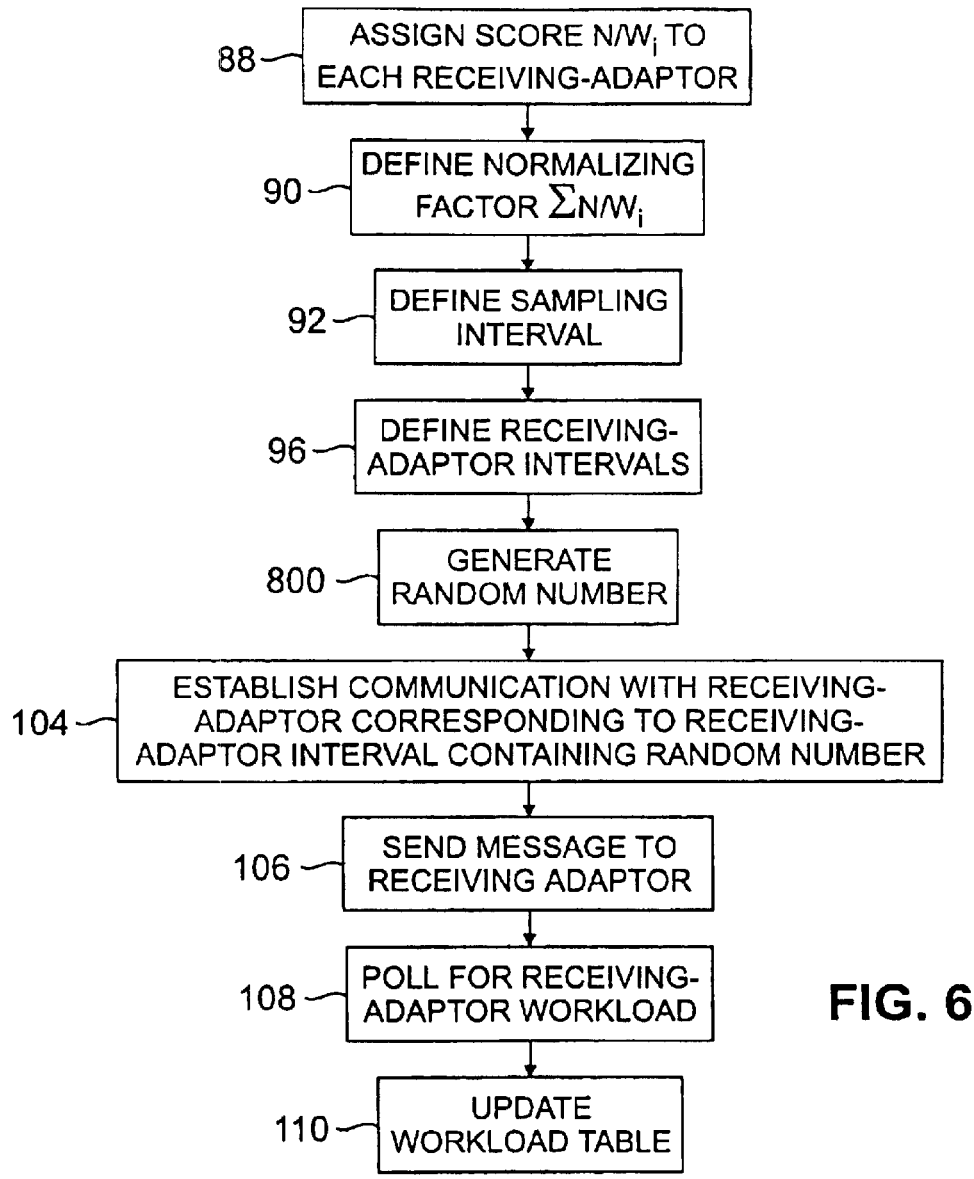
FIG. 6 is a flow-chart illustrating a method for selecting a remote adaptor with which to communicate.
Figure 7:
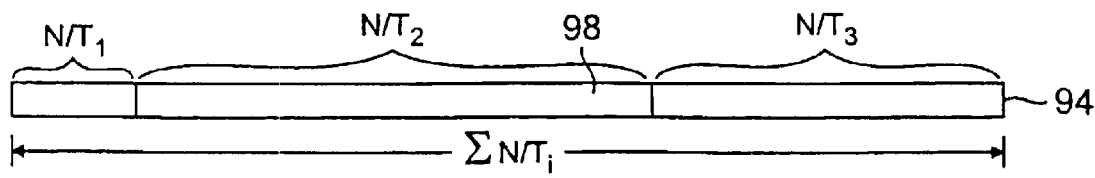
FIG. 7 is a sampling interval for the remote adaptor selection method illustrated in FIG. 6.

Referring to FIG. 6, selection of a receiving adaptor 82 with which to communicate begins with the sending adaptor 80 assigning 88 a score to each receiving adaptor 82. The sending adaptor 80 does so by weighting the reciprocal of the table entry associated with each receiving adaptor 82 by an integer large enough to avoid time-consuming floating point operations in the steps that follow. The resulting score is referred to as the "inverse workload" for that receiving adaptor 82. The sending adaptor 80 then sums 90 the inverse workloads for all receiving adaptors 82 and defines 92 a sampling interval 94 having a length equal to that sum, as shown in FIG. 7.

The sampling interval 94 is then subdivided 96 into as many sub-intervals 98 as there are receiving adaptors 82. Each sub-interval 98 has a length that corresponds to the inverse workload of the receiving adaptor 82 with which it is associated. In addition, each sub-interval 98 is disjoint from all other sub-intervals. As a result, each point on the sampling interval 94 is associated with one, and only one, receiving adaptor 82.

Once the sub-intervals are defined, the sending adaptor 80 executes 100 a random number process 102 that generates a random number having a value that is uniformly distributed over the sampling interval 94. The random number will thus have a value that places it in a sub-interval 98 corresponding to one of the receiving adaptors 82. The probability that the random number will be in a sub-interval 98 corresponding to a particular receiving adaptor 82 depends on the inverse workload of that receiving adaptor 82 relative to the inverse workloads of all other receiving adaptors.

The sending adaptor 80 then establishes 104 communication with and sends 106 a message to the selected receiving adaptor 82 corresponding to the sub-interval 98 associated with the value of the random number. The sending adaptor 80 then polls 108 the receiving adaptor 82 to obtain a new estimate of its workload and updates 110 the entry in its workload table 86 that corresponds to that receiving adaptor 82.

By using a locally-cached last-known workload rather than polling each receiving adaptor 82 to obtain a current workload, the sending adaptor 80 can rapidly select a receiving adaptor 82 that, although not guaranteed to have the smallest workload, most likely does. Because each receiving adaptor 82 has some probability of being selected, the probabilistic selection process described above avoids neglecting any receiving adaptor 82. This ensures load balancing among the receiving adaptors 82. This also ensures that receiving adaptors 82 that were once found to be busy are occasionally polled to see if they have since become relatively idle.

Having described the invention and a preferred embodiment thereof, what we claim as new, and secured by Letters Patent is:

1. A method for selecting a resource from a plurality of resources, said method comprising:
   determining a score for said resource on the basis of a stochastic property of said resource;
   defining an interval corresponding to said resource, said interval having an extent that depends on said score;
   generating a random number; and
   selecting said resource if said random number is within said interval.

2. The method of claim 1, wherein defining an interval corresponding to said resource comprises
   determining a normalized score for said resource; and
   defining an extent of said interval on the basis of said normalized score.

3. The method of claim 2, wherein determining a normalized score comprises
   evaluating a sum of scores assigned to each resource in said plurality of resources; and
   normalizing said score assigned to said resource by said sum of scores.

4. The method of claim 1, wherein generating a random number comprises generating a uniformly distributed random number.

5. The method of claim 1, further comprising polling a selected resource to update a prior measurement of said stochastic property associated with said resource.

6. The method of claim 1, wherein determining said score comprises estimating a present value of said stochastic property on the basis of a prior measurement of said stochastic property.

7. The method of claim 6, further comprising selecting said prior measurement to be a most-recently known value of said stochastic property.

8. The method of claim 1, further comprising selecting said resource to be a processor having a variable workload.

9. The method of claim 8, wherein determining a score for said resource comprises obtaining an estimate of a present workload of said processor.

10. The method of claim 9, wherein determining a score for said resource further comprises evaluating an inverse of said estimate of said present workload of said processor.

11. The method of claim 9, wherein obtaining an estimate of a present workload of said processor comprises retrieving, from memory, a last-known workload of said processor.

12. The method of claim 1, further comprising selecting said resource to be a queue having a variable queue-length.

13. A method for selecting a queue from a plurality of queues, said method comprising:
   assigning a score to said queue;
   defining an interval corresponding to said queue, said interval having an extent that depends on said score;
   generating a random number; and
   selecting said queue if said random number is within said interval.

14. The method of claim 13, wherein assigning said score comprises determining an effective queue-length of said queue.

15. The method of claim 14, wherein determining said effective queue-length comprises estimating a queue-length of said queue.

16. The method of claim 15, wherein determining said effective queue-length comprises determining a priority of said queue.

17. The method of claim 16, wherein assigning said score comprises weighting said queue-length with said priority.

18. The method of claim 13, wherein defining an interval comprises selecting said extent on the basis of a normalized score.

19. The method of claim 18, wherein selecting said extent on the basis of a normalized score comprises:
   evaluating a sum of scores of all queues in said plurality of queues; and
   normalizing said score for said queue by said sum of scores.

20. The method of claim 13, wherein generating a random number comprises generating a uniformly distributed random number.

21. The method of claim 15, wherein estimating the number of waiting elements in said queue comprises determining a last-known queue-length for said queue.

22. The method of claim 21, further comprising:
   polling said selected queue to determine a queue-length of said selected queue; and
   updating said last-known queue-length for said selected queue.

23. The method of claim 22, wherein updating said last-known queue length comprises polling said selected queue to determining a number of waiting elements in said selected queue.

24. The method of claim 23, further comprising caching said number of waiting elements for use in estimating a length of said queue.

25. A computer-readable medium having encoded thereon software for selecting a resource from a plurality of resources, said software comprising instructions for:
   determining a score for said resource on the basis of a stochastic property of said resource;
   defining an interval corresponding to said resource, said interval having an extent that depends on said score;
   generating a random number; and
   selecting said resource if said random number is within said interval.

26. A computer-readable medium having encoded thereon software for selecting a queue from a plurality of queues, said software comprising instructions for:
   assigning a score to said queue;
   defining an interval corresponding to said queue, said interval having an extent that depends on said score;
   generating a random number; and
   selecting said queue if said random number is within said interval.

* * * * *